May 9, 1939.  G. A. TINNERMAN  2,157,251
HANDLE, KNOB, OR LIKE CONSTRUCTION
Filed May 20, 1938
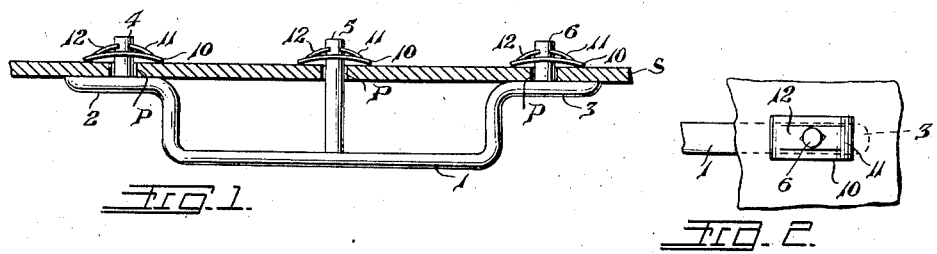
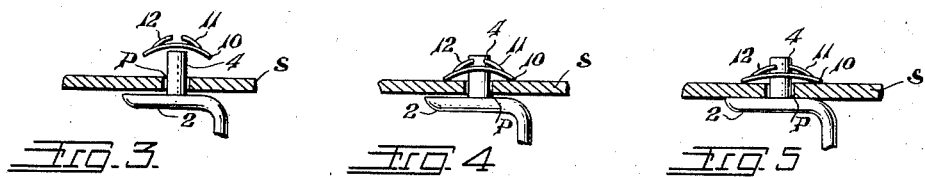
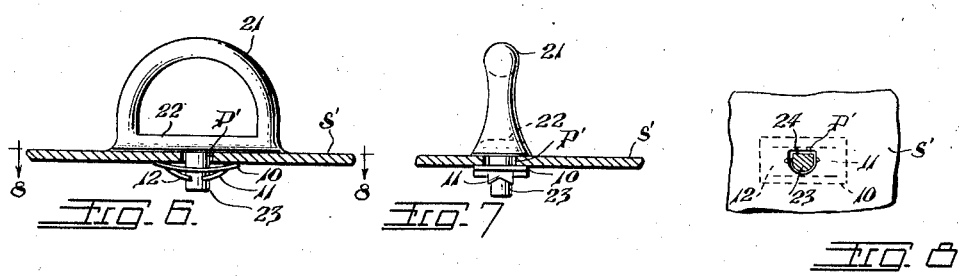
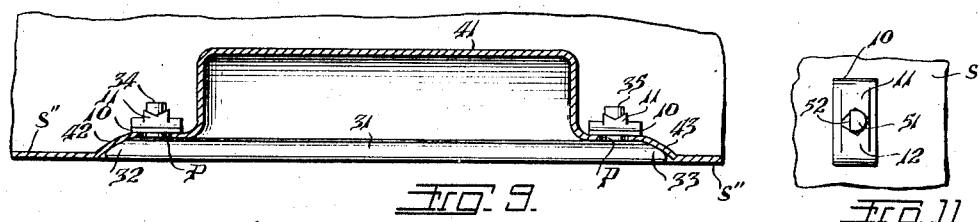
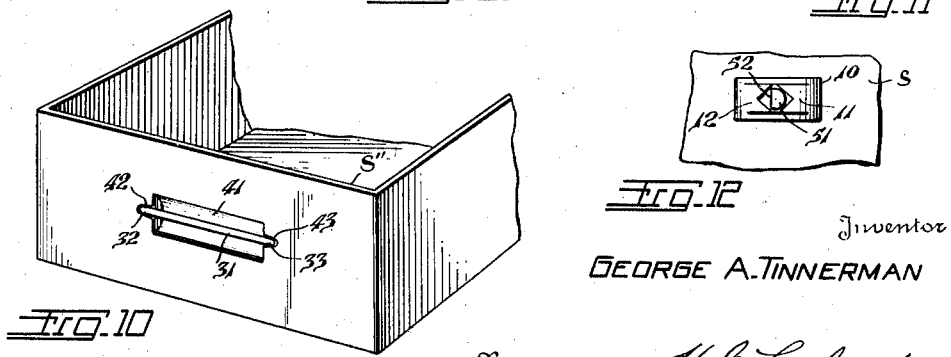
Inventor
GEORGE A. TINNERMAN
By H. G. Lombard
Attorney Patented May 9, 1939

2,157,251

UNITED STATES PATENT OFFICE 2,157,251

HANDLE, KNOB, OR LIKE CONSTRUCTION

George A. Tinnerman, Rocky River, Ohio, assignor to Albert H. Tinnerman, Cleveland, Ohio Application May 20, 1938, Serial No. 209,104

4 Claims. (Cl. 16—110)

This invention relates to trim handles, knobs and like constructions, generally, and deals more particularly, with such devices formed of hardened plastic material molded into any selected design or configuration together with means for mounting the same onto a supporting member in a new and novel manner to serve their usual purpose and otherwise embellish the supporting surface and create a novel and artistic appearance.

It has been found that threaded metallic inserts molded with the plastic parts are objectionable and expensive in that they make for increased shipping weight, require longer curing cycles for hardening, and involve added costs in requiring the use of special forms and molding equipment to insure that the plastic composition, when being flowed into the mold, will not disturb the position of the metallic insert in the completed plastic part.

In the use of screw-threaded fastening devices in plastic parts, a hole must be bored, the hole tapped, and the fastening device laboriously threaded into the tapped hole. This procedure is expensive in that it requires several time-consuming operations, results in the weak threads that easily cross and tend to break quickly, and which, most often, are not in proper alignment due to the infinite number of porous, rough spots, thin-walled gas pockets and other mold imperfections which prevent the screw-threads of a fastening from being accurately and precisely threaded into a tapped hole provided in the molded plastic part.

The use of an adhesive such as cement for uniting a plastic part with a supporting member has been found unsatisfactory in that it tends to dry out quickly and works loose due to changes in atmospheric conditions and frequent handling. Then again, in employing a cement, the assembly must usually be subjected to an expensive and time-consuming fusing operation in order to obtain a satisfactory connection of the plastic part with the supporting member.

It is therefore an object of this invention to provide a trim handle, knob or like installation comprising a hardened plastic trim object provided with simple, inexpensive attaching means in the form of an integral connecting stud arrangement permitting easy, quick and reliable mounting thereof onto a supporting surface to serve its usual purpose and otherwise embellish such surface and create a novel and artistic appearance.

Another object contemplates the provision of such a trim handle, knob or like installation in which the hardened plastic trim object is mounted by securing means designed for rigid fastening engagement with integral, rigid connecting stud elements or the like, provided on the plastic object in the molding operation thereof.

A further object is to provide a mounting for plastic trim handles, knobs and the like, held in position by securing means simplifying the assembly thereof onto a supporting surface and without requiring the use of adhesives, cement or screw-threaded fastenings such as threaded metallic inserts or drive screws.

A still further object is to provide a mounting for hardened plastic trim handles, knobs or the like comprising integral, rigid, connecting studs or projections to which individual securing devices may be readily applied to permanent engagement therewith in providing a tightened rigid assembly under continuously effective spring holding action.

A more specific object is to provide an installation comprising a handle, knob or similar plastic trim object provided with integral connecting studs of suitable design to which individual securing means such as spring locking plates and the like, may be readily applied in providing the desired mounting but which may be removed in a quick, simple manner without injuring or mutilating either the securing means or the connecting studs such that the same may be again employed in the same or a similar installation.

Further objects and advantages of the invention, and other new and useful features in the construction, arrangement and general combination of parts will be apparent to those skilled in the art as a description thereof proceeds with reference to the accompanying drawing in which like reference characters designate like parts throughout the same, and in which:

Fig. 1 is a fragmentary section through a supporting member such as a sheet metal wall panel, showing in elevation a form of hardened plastic trim handle and the integral connecting stud arrangement for mounting the same employing securing means in the form of individual spring locking plates;

Fig. 2 is a fragmentary plan view of Fig. 1 showing one of the securing devices in applied fastening position on its associated connecting stud;

Figs. 3-5 inclusive show the several steps in the application of a spring locking plate securing device, shown in Fig. 1, to positive fastening engagement with a connecting stud in providing a rigid, tightened installation under continuously effective spring holding action;

Fig. 6 is a fragmentary section through a supporting wall member, showing in side elevation, a form of hardened plastic knob device as applied to mounted position by means of the integral connecting stud arrangement of the present invention;

Fig. 7 is an edge view of Fig. 6;

Fig. 8 is a sectional view of Fig. 6 taken on a plane indicated by line 8—8, looking in the direction of the arrows;

Fig. 9 is a fragmentary section through a supporting wall showing a further embodiment of the invention in the form of a sunken handle construction comprising a hardened plastic trim object provided with the integral connecting stud attaching means;

Fig. 10 is a fragmentary perspective showing the exterior appearance of a drawer or the like, provided with the sunken handle construction illustrated in Fig. 9;

Figs. 11 and 12 illustrate a modified form of a connecting stud arrangement having a cutaway or reduced portion designed to permit disassociation of the securing means therefrom by relative rotary movement, Fig. 11 showing in plan a securing device as disposed in locked engagement with the shank of such a connecting stud in applied fastening position; and, Fig. 12 is a similar view showing the securing device disposed substantially ninety degrees removed from applied fastening position with the connecting stud thereby permitting removal of the securing device therefrom.

In carrying out the present invention a plastic trim handle, knob or like part is constructed of any desired design, shape or configuration of suitable cross-section with, preferably, at least one face which is substantially flat or of such contour as to seat flush with the surface of the supporting member to which it is attached. The plastic object thus provided is formed with one or more projections or connecting studs adapted for use with securing devices in the form of clip fastenings, friction collars, rings, clasps, or the like, which may be easily and quickly applied to engage therewith whereby the plastic object is reliably and securely held in mounted position. The connecting studs are suitably formed on the plastic object either by providing integral hubs or bosses which are ground, machined or otherwise finished to produce the desired shape, or by so designing the mold form such that integral connecting studs of desired shape and form are provided on the finished plastic object when taken from the mold.

It has been found, however, that the latter method for providing integral connecting studs on the plastic part during the molding operation thereof is the most practical in that little or no added cost or expense is involved and no time-consuming finishing operations for the plastic object are required.

A most important problem involved in the use of hardened plastic materials for providing handles, knobs and like parts, resides in the fact that it is often necessary or desirable that such part be of comparatively thin cross-section and usually of insufficient thickness to receive a metallic insert or threaded screw fastening. By the arrangement of the present invention, the use of all threaded fastenings is avoided and, in employing connecting studs integrally provided on the hardened plastic part, the same may be formed into any selected decorative configuration and of as thin a cross-section as may be necessary or desirable.

Referring now, more particularly, to the drawing, Fig. 1 shows an installation for mounting a hardened plastic trim handle or the like onto a supporting wall member, designated generally S, which, of course, may be of any suitable material; however, inasmuch as the instant invention is intended primarily for use with metallic structures, such supporting member usually comprises a sheet metal panel or plate-like element, as illustrated. In order that the hardened plastic trim handle or the like may be mounted thereon, the said supporting structure is provided with perforations P disposed at suitably spaced points along which the plastic trim object extends in mounted position. Such perforations may be of any suitable contour but preferably are round, as shown, to receive snugly the substantially round shank of the connecting studs most effectively in a completed installation. The said perforations may be provided in the supporting member constituting the support as by punching prior to the application of the trim object thereto, or the installation thereof as a part of a completed structure and, of course, may be formed in any other convenient manner as by drilling, boring etc.

In the use of hardened plastic materials in providing the improved trim handle, knob or like construction of the present invention, it is possible to mold the same, at little or no added cost, with integral connecting studs suitably designed for passing through the perforations in the supporting member S to project onto the reverse side thereof where they are held firmly in applied position by individual securing devices such as sheet metal locking plates or the like. Thus, as shown in Fig. 1, the hardened plastic trim handle is so formed as to provide a gripping portion 1, including integral relatively thin base flanges 2, 3, together with integral connecting studs 4, 5, 6 suitably designed and properly spaced for passing through the perforations provided in the supporting wall member S to project onto the reverse side thereof. In this relation, the flanges 2, 3 of the plastic trim handle are seated in flush engagement with the forward side of the support such that when the individual securing devices are applied to the projecting portions of the connecting studs at the reverse side thereof the handle is securely mounted in a fixed, rigid installation.

As illustrated in Figs. 1 and 2, the securing devices 10 may be in the form of substantial locking plate members each comprising a small, inexpensive section of sheet metal provided with yieldable tongues 11, 12 or similar lug holding elements which may flex and be forced apart when a connecting stud is introduced therebetween and thus caused to assume opposing, substantially inclined positions frictionally and grippingly engaging the connecting stud to retain the plastic part in mounted position. Preferably, the said tongues of the securing devices are notched at their extremities to provide sharp jaws adapted to bite into the connecting studs under tension in substantially locked engagement therewith in applied position. Thus, any attempt to withdraw a connecting stud from applied position with a locking plate will be tenaciously resisted by the tensioned tongues due to their inclined positions in a direction opposed to reverse movement of the connecting stud from such applied position. In effect, any outward pull of the plastic object to remove a connecting stud from securing engagement with the tensioned tongues of a locking plate causes the jaws thereof to bite deeper into the shank of the hardened plastic connecting stud. It will therefore be seen that, after having thus been mounted on a supporting member, a plastic object is so securely mounted that it cannot be removed without mutilating, deforming or otherwise injuring the securing devices and damaging the connecting studs such that they are unfit for use in the same or similar assembly. If desired, the individual securing devices may be permanently attached to the supporting member by any expedient means such as riveting, spot-welding, etc., such that the assembly of a plastic part with the supporting member is facilitated and greater security of the plastic object against shifting from mounted position is obtained.

Although the securing devices are shown as comprising substantially flat sections of relatively thin metal, preferably spring steel, and provided with gripping elements in the form of one or more tongues deformed from the plane of such sections, it is fully intended as within the scope of this invention, that the securing devices be constructed from any other suitable material, such as treated sheet metal, cold rolled steel, sections of papier-mâché, and the like and provided with any other suitable form of gripping elements adapted to engage the integral connecting studs on a plastic object in the manner of friction collars, locking rings, clips, clamps, clasps, etc. This invention also comprehends the use of connecting studs of any desired cross-section and, if expedient or desirable, provided with shoulders, abutments, grooves, etc. cooperating with the gripping elements of the securing means to resist withdrawal and prevent removal of a plastic object from its applied mounted position on a supporting member.

However, it will quite readily be recognized that the form of securing devices employed in the present invention comprising tongue gripping elements, are most advantageous in that they are inexpensive, simple, durable, light in weight, and easily and quickly applied to fastening position. This takes place by reason of the fact that the said gripping elements are preferably in the form of yieldable tongues which, initially, present a substantial socket facilitating application of the connecting stud thereto, and subsequently, flex to permit the connecting stud to be advanced to home position whereupon they are effective to grippingly engage and frictionally retain the stud in fixed, rigid applied position. Thus, the yieldable action of the tongues allows them to serve substantially as spring gripping elements in which relation they are admirably suited for use with connecting studs of different diameters and various cross-sections in addition to providing a substantially positive locked mounting of a plastic object in assembled relation on a supporting member.

Figs. 3–5 inclusive show the application and use of a preferred form of locking plate of the type just described which is especially designed to provide a rigid, tightened installation at all times under, what may be termed, a continuously effective spring holding action. Thus, as previously described, the locking plate may comprise a sheet metal section having opposed yieldable tongues 11, 12, struck and formed therefrom to project out of the plane thereof and otherwise extending upwardly intermediate bridge portions and end portions providing the body of the locking plate. However, the body of the locking plate, defined by the sheet metal section, is deformed out of flat in the stamping operation to provide a pronounced, generally concave base thereto in normal, untensioned relation substantially as shown in Fig. 3. Since the base of this form of locking plate is flexible, the tongue elements thereof are necessarily relatively yieldable with respect to each other and relative to said base. Such devices are therefore readily adapted for sliding engagement with the shank of a connecting stud in one direction in substantially the manner of a clutch and accordingly, may be speedily applied to fastening position by a substantial axial, thrust-like motion in a minimum of time and effort, and flattened in such fastening position thereby fixedly and rigidly securing the assembled members of an installation under continuously effective spring tension.

When the spring locking plates are initially applied to the projecting shanks of the connecting studs and pressure exerted thereon in a substantial axial, thrust like movement, as aforesaid, the said yieldable tongues thereof are caused to slide along the shanks to the point at which the end portions of the generally concave base, contact the adjacent surface of the supporting member substantially as shown in Fig. 4. At such point, upon continued pressure on the generally concave base of the locking plate, the end portions thereof are moved from their initial, normally untensioned position in the generally concave base outwardly and upwardly in a substantial lifting force which is transmitted to the tongues to urge the notched extremities thereof inwardly toward each other to the extent that the said tongues are caused to dig into and become embedded in the shank of the connecting stud and thereby resist any tendency of the same toward reverse movement or loosening. At the same time, the bowed bridge portions of the locking plate are elongated such that the generally concave base thereof is tensioned and assumes the position of a substantially flat section, Fig. 5, which, in attempting to assume its initial, normally untensioned, concave configuration, naturally tends to draw the shank of the stud axially thereby taking up any clearance in the assembly and rigidly securing the hardened plastic part to the supporting structure under continuous spring tension. In this way the spring locking plates serve to exert a continuously effective spring holding action axially of the shanks of the connecting studs thereby initially drawing the plastic part into close, rigid engagement with the supporting structure and thereafter retaining the parts of the installation in firm, fixed engagement without possibility of becoming loose or removed.

As stated, this most advantageous axial drawing action supplied by a spring locking plate to provide a tight, rigid installation, is effected by the tensioned end portions and bridge portions thereof which are moved from their pronounced, concave configuration when normally untensioned, as represented in Fig. 3, to assume the position of a substantially thin, flat section in final applied position as shown in Fig. 5. It has been found that this most effective locking and drawing action of a spring locking plate to provide a tight, rigid installation is best obtained when the generally concave base thereof is flattened without any substantial pressure being exerted on the tongue elements themselves; any substantial pressure on the tongues prevents the locking plate from having smooth, sliding engagement with the shank of the connecting stud on being applied, and also bends the tongues with respect to the generally concave base such that the extremities thereof are deformed out of most effective contact with the cooperating shank, wherefor the tongues may have a tendency to slip and permit the locking plate to loosen from applied position in a completed installation. This application of the spring locking plates is best accomplished by the use of a special tool comprising spaced jaws which may be fitted to the bridge portions of the generally concave base of a locking plate without materially contacting the tongue elements thereof. Thus, by a substantial axial thrust, pressure may be applied to the said bridge portions to flatten and tension the same in the generally concave base without deforming the tongues; and accordingly when the tool is withdrawn and the attendant pressure removed from the said flattened bridge portions, the tension stored therein causes the tongues to become embedded in the stud and, at the same time, necessarily causes an axial drawing action thereon thereby providing a locked, tightened, rigid installation at all times under continuously effective spring holding action.

Figs. 6–8 inclusive show a further embodiment of the invention in which the integral connecting stud arrangement and individual locking plate securing means just described are employed for providing a fixed, rigid mounting for a hardened plastic knob or similar device. As shown in Fig. 6, this device may be suitably formed to comprise an apertured gripping element 21 including a relatively thin base portion 22 provided with one or more integral connecting studs 23, the said base portion being of insufficient thickness to receive a metallic insert or threaded fastening. In a preferred form, the said connecting stud 23 is provided with at least one flat face 24, Fig. 8, presenting a substantially D-shaped shank designed for fitting into a corresponding D-shaped opening P' provided in the supporting wall member S'. In this relation, the flat face 24 of the connecting stud is disposed in abutting relation with the straight side wall of the D-shaped opening P' thereby preventing shifting movement of the knob device in mounted position on the supporting wall member and particularly eliminating any relative rotary movement thereon. Accordingly, with the knob device assembled onto the supporting member with the D-shaped connecting stud 23 fitted into corresponding D-shaped opening P', as aforesaid, to project onto the reverse side thereof, the spring locking plate 10 or similar securing means is applied thereto in a manner substantially the same as the procedure described with reference to the form of the invention illustrated in Figs. 1–5 inclusive.

Figs. 9 and 10 show still another embodiment of the invention in which a hardened plastic gripping element is designed for use in providing a sunken handle arrangement, or the like, for use as a sunken drawer pull or sunken cabinet handle construction substantially as illustrated in Fig. 10. The hardened plastic gripping element, of course, may be formed in any selected decorative or artistic configuration but is preferably provided in the form of a simple, inexpensive trim strip 31 having tapered extremities 32, 33 serving as base attaching portions and which are provided with integral connecting studs 34, 35 on the underface thereof.

The supporting wall member designated generally S' represents a drawer or cabinet front as shaped from sheet metal to present a sunken area 41 formed therein by means of a suitable die to a depth and breadth sufficient to permit an easy hand grip on the gripping element 31 when attached thereto. Adjacent such sunken area there is also provided, if desired, opposed depressions 42, 43, designed to receive the base portions or extremities 32, 33 of the gripping element such that the exterior surface of the supporting member is flush and even substantially as shown in Fig. 9. These depressions are preferably formed substantially at the center of the sunken area 41 and provided with the usual perforations P for receiving the shanks of the connecting studs. Thus, it will be understood that in this form of the invention, the gripping element 31 is attached in mounted position substantially at the mid-portion of the sunken area 41 with the extremities 32, 33 thereof seated in the depressions 42, 43 and with the integral connecting studs 34, 35 passing through the perforations to project onto the reverse side of the supporting wall member. Securing means such as the spring locking plates 10 may then be applied to the projecting portions of the integral connecting studs, Fig. 9, to provide a rigid, positive mounting of the gripping element substantially as set forth with respect to the form of the invention disclosed in Figs. 1–5 inclusive.

In certain installations, it is necessary or desirable that the spring locking plate be removable from locking engagement with the shank of the connecting stud in order that the parts of an installation may be disassociated to permit access to concealed parts or to replace a damaged member. To this end, there may be employed an arrangement such as illustrated in Figs. 11 and 12 which represents the underside of an installation wherein the integral connecting stud of a plastic part is provided with a cutaway portion whereby a quick, simple, relative, rotary movement disposes the extremities of the tongues of the locking plate out of fastening engagement with the shank of the connecting stud thereby permitting the same to be removed therefrom. A preferred construction of this nature, embodies the use of a connecting stud 51 having an area at one side thereof cutaway to present a reduced portion designated generally 52. Thus, as shown in Fig. 11, in a completed installation, such a stud having a reduced portion, in one position, is readily engaged by the tongues 11, 12 of the spring locking plate 10 in the manner described with reference to the form of the invention shown in Figs. 1 to 5 inclusive, to firmly and rigidly retain the assembled members in applied position. If, however, it is desired to remove the locking plate from such applied position, it is only necessary to rotate the same ninety degrees relative to the connecting stud, to the position illustrated in Fig. 12, whereupon the reduced portion 52 is disposed in the space between the extremities of the tongues 11, 12. In this relation, the extremities of the tongues are out of contact with the connecting stud and sufficient clearance is provided to allow the locking plate to be removed and the shank of the retainer withdrawn therefrom, thereby permitting the members of the installation to be disassociated.

Although in the foregoing description and the accompanying drawing, the disclosure is directed to several embodiments in both knob and handle constructions, it is obvious that the invention is applicable whenever an operating member, gripping element or the like is to be mounted onto a wall member, particularly a sheet metal wall surface. Accordingly, it will be understood that the disclosure is not to be limited to any strict interpretation of the word "handle" as used in the accompanying claims but should be considered generally as defining knobs, gripping devices, supporting devices, drawer pulls and the like.

While this invention has been described in detail with specific examples such examples are illustrative only, since it will be apparent to those skilled in the art that other modifications within the spirit and scope of the invention may be constructed without departing from the teachings or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Means for mounting a handle, knob or the like onto an apertured supporting member, said handle comprising a one-piece device formed to provide a gripping element including a base attaching portion and a connecting stud projecting therefrom, said stud having a flat face and being receivable in an aperture in said supporting member to seat said base portion of the handle thereon with said stud projecting onto the reverse side thereof, said aperture having a straight side wall against which the flat face of said stud is disposed in abutting relation thereby preventing relative shifting movement of the handle or the like in applied mounted position on said supporting member, and means for securing the handle in the applied mounted position thereof, said means comprising a friction lug holding element engaging the projecting portion of said stud at points other than said flat face thereof.

2. Means for mounting a handle, knob or the like onto an apertured supporting member, said handle comprising a one-piece device formed to provide a gripping element including a base attaching portion and an integral connecting stud projecting therefrom, said stud having a flat face and being receivable in an aperture in said supporting member to seat said base portion of the handle thereon with said stud projecting onto the reverse side thereof, said aperture having a straight side wall against which the flat face of said stud is disposed in abutting relation thereby preventing relative shifting movement of the handle or the like in applied mounted position on said supporting member, and means for securing the handle in the applied mounted position thereof, said means comprising a friction lug holding element engaging the projecting portion of said integral connecting stud at points other than said flat face thereof and exerting an axial drawing action thereon under continuously effective spring tension whereby said handle or the like is retained in fixed, rigid mounted position on said supporting member.

3. Means for mounting a handle, knob or the like onto an apertured supporting member, said handle comprising a one-piece device formed to provide a gripping element including a base attaching portion and integral connecting stud projecting therefrom, said stud comprising a shank having a reduced portion providing a flat face and being receivable in an aperture provided in said supporting member to project onto the reverse side thereof in the applied mounted position of the handle or the like, and means for securing the handle in such applied mounted position, said means comprising a friction lug holding element engaging the projecting portion of said stud at points other than the said flat face reduced portion thereof, said stud being removable upon relative movement disposing said lug holding element of the securing means in the area of said reduced portion.

4. Means for mounting a handle, knob or the like onto an apertured supporting member, said handle comprising a one-piece device constructed of hardened plastic material formed to provide a gripping element including a base attaching portion and integral connecting stud projecting therefrom, said stud comprising a smooth shank but having a reduced portion providing a flat face and being receivable in an aperture provided in said supporting member to project onto the reverse side thereof in the applied mounted position of the handle or the like, and means for retaining the handle in such applied mounted position, said means comprising a securing device having a lug holding element frictionally and grippingly engaging the projecting portion of said stud at points other than the said flat face reduced portion, said handle being dismountable upon relative movement disposing said lug holding element of the securing device in the area of said reduced portion of the connecting stud.

GEORGE A. TINNERMAN.